United States Patent [19]

Obara et al.

[11] Patent Number: 4,816,636
[45] Date of Patent: Mar. 28, 1989

[54] WIRE CUT ELECTRIC DISCHARGE MACHINE

[75] Inventors: Haruki Obara, Sagamihara; Toshiyuki Aso, Hino; Hiroshi Kinoshita, Hachioji, all of Japan

[73] Assignee: Fanuc Ltd., Yamanashi, Japan

[21] Appl. No.: 19,271

[22] PCT Filed: Jul. 4, 1986

[86] PCT No.: PCT/JP86/00344

§ 371 Date: May 4, 1987

§ 102(e) Date: May 4, 1987

[87] PCT Pub. No.: WO87/00103

PCT Pub. Date: Jan. 15, 1987

[30] Foreign Application Priority Data

Jul. 4, 1985 [JP] Japan .................. 60-145691

[51] Int. Cl.$^4$ .............................................. B23H 7/10
[52] U.S. Cl. ................................. 219/69 W; 204/206
[58] Field of Search .......... 219/69 W; 83/639, 926 B; 140/139, 140; 204/206, 224 M

[56] References Cited

U.S. PATENT DOCUMENTS

| | | | |
|---|---|---|---|
| 3,269,248 | 8/1966 | Nast et al. | 83/639 |
| 4,242,559 | 12/1980 | Roemer et al. | 219/69 W |
| 4,412,118 | 10/1983 | Nomura et al. | 219/69 W |
| 4,523,074 | 6/1985 | Okuda | 219/69 W |
| 4,539,459 | 9/1985 | Yamagata | 219/69 W |
| 4,547,647 | 10/1985 | Schneider | 219/69 W |
| 4,698,476 | 10/1987 | Yamamoto et al. | 219/69 W |

FOREIGN PATENT DOCUMENTS

| | | |
|---|---|---|
| 56-3146 | 1/1981 | Japan . |
| 56-10130 | 3/1981 | Japan . |
| 56-82134 | 7/1981 | Japan .............. 219/69 W |
| 56-82133 | 7/1981 | Japan . |
| 149126 | 9/1982 | Japan .............. 219/69 W |

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

A wire cut electric discharge machine for electric discharge machining a work (W) held on a work table (24). A wire electrode (14) supplied by a wire supplying device (12) is passed between upper and lower heads (22, 26) under tension through an electric discharge machining region where the work (W) is subjected to electric discharge machining. When a breakage of the wire electrode is detected during the electric discharge machining operation by a suitable detector, the broken wire electrode is drawn back and held in the neighborhood of the upper head (22) by a wire electrode feeding mechanism, the broken end of the wire electrode is detected outside the electric discharge machining region by a broken end detecting device (66), the work table is shifted by a XY driving mechanism from the electric discharge machining region to a predetermined wire repairing position, the broken end is cut and removed to repair the wire electrode with a cutter (60) and a cutting block (64) at a wire electrode repairing position separated from the electric discharge machining region, the work table is returned to the electric discharge machining region by the XY driving mechanism, the repaired wire electrode (14) is extended again between the upper and lower heads (22, 24) by means of a jet nozzle (74), and then the electric discharge machining operation is restarted.

5 Claims, 3 Drawing Sheets

WIRE CUT ELECTRIC DISCHARGE MACHINE

TECHNICAL FIELD

The present invention relates to a wire cut electric discharge machine and, more particularly, to a wire cut electric discharge machine capable of automatic preparation for restarting the electric discharge machining of a work by automatically extending a wire electrode between an upper head and a lower head each having a built-in wire guide after repairing the broken end of the wire electrode at a repairing position outside an electric discharge machining region, when the wire electrode is broken during electric discharge machining.

BACKGROUND ART

A wire cut electric discharge machine employing a wire-shaped or belt-shaped electrode (hereinafter referred to as "wire electrode"), equipped with a clamping mechanism for clamping the wire electrode on the wire feeding side when the wire electrode is broken during electric discharge machining, and a wire feeding mechanism for feeding the wire electrode clamped on the feeding side as far as the extremity of the wire electrode coincides with a predetermined position, and capable of automatically passing the wire electrode from the feeding side through the work has been proposed, for example, in Japanese Unexamined Patent Publication (Kokai) No. 56-3146. This known wire cut electric discharge machine prepares for restarting a wire cut electric discharge machining operation by passing the broken end of the wire electrode through a wire electrode receiving hole formed in the work after determining that the broken end of the wire electrode has been clamped, and then drawing the wire electrode by a motor-driven electrode drawing mechanism to extend the wire electrode between the upper and lower heads disposed above and below the electric discharge machining region, respectively. In this known wire cut electric discharge machine, the procedure for preparing the wire cut electric discharge machine for restarting the wire cut electric discharge machining as well as the wire cut electric discharge machining operation is controlled by a CNC unit (Computer-aided Numerical Control unit). However, when the wire cut electric discharge machine is passing the wire electrode through the wire electrode receiving hole of the work after the occurrence of he breakage of the wire electrode, if the wire electrode is fed without repairing the broken end of the wire electrode to pass the same through the wire electrode receiving hole of the work, often the wire electrode cannot be passed properly through the wire electrode receiving hole of the work due to the residual bend and/or roughened surface of the broken end of the wire electrode caused by electric discharge between the wire electrode and the work, or the diagonal running of the wire electrode for taper-machining of the work. Accordingly, it is necessary to repair the broken end of the wire electrode by removing the bent and roughened portion of the broken end of the wire electrode and to remove the chips of the wire electrode from the work before automatically connecting the wire electrode under the control of the CNC unit to prepare the wire electrode for restarting the wire cut electric discharge machining.

DISCLOSURE OF THE INVENTION

Accordingly, an object of the present invention is to provide a method of automatically repairing the broken wire electrode, and a wire cut electric discharge machine comprising means for carrying out the method, which are capable of complying with the foregoing necessity.

In view of the object of the invention, the present invention provides a wire cut electric discharge machining method, in which a wire electrode fed from a wire electrode supply device is extended between respective wire guides of upper and lower heads disposed above and below an electric discharge machining region, respectively, by means of a jet of a machining liquid for automatic preparation for restarting wire cut electric discharge machining operation, comprising steps of: drawing out a broken end of the wire electrode from a work when said wire electrode is broken during electric discharge machining, cutting and repairing the broken end at a predetermined wire electrode repairing position relatively separated from the discharge machining region, returning the repaired end of the wire electrode to the electric discharge machining region or to a position near the electric discharge machining region, and extending the wire electrode again between the upper and lower heads. Thus, according to the wire cut electric discharge machining method, the broken end of the wire electrode is cut for repair at a position separated from the electric discharge machining region, and thereby both the necessity of repairing the broken end of the wire electrode and the avoidance of leaving the cut and removed broken end of the wire electrode on the work are achieved. In order to carry out the aforesaid wire cut electric discharge machining method, the present invention provides a wire cut electric discharge machine comprising: a work table for holding a work, capable of being automatically moved in a plane defined by an X-axis and a Y-axis; a wire electrode supplying device for supplying a wire electrode through an electric discharge machining region for the work held on the work table; an upper head and a lower head having built-in wire guides, respectively, and disposed above and below the work table, respectively; and an automatic wire electrode setting mechanism which automatically passes the wire electrode supplied by said wire electrode supplying device through the work and extends the wire electrode automatically between the upper and lower heads for the automatic preparation for restarting the electric discharge machining; characterized by further comprising: a wire electrode feeding mechanism which draws back a broken end of the wire electrode broken in the electric discharge machining region during an electric discharge machining operation from the electric discharge machining region and holds the broken end of the wire electrode so as to be able to be drawn out; a wire end detecting means which detects the broken end of the wire electrode at a position outside the electric discharge machining region; a shifting means which shifts the broken end of the wire electrode relatively away from the electric discharge machining region to a predetermined wire electrode repairing position upon detection of the broken end of said wire electrode by said wire end detecting means and returns the repaired wire electrode from the electrode wire repairing position to a position from which the wire electrode is fed for restarting an electric discharge machining operation;

BEST MODE FOR CARRYING OUT THE INVENTION

Figure 1:
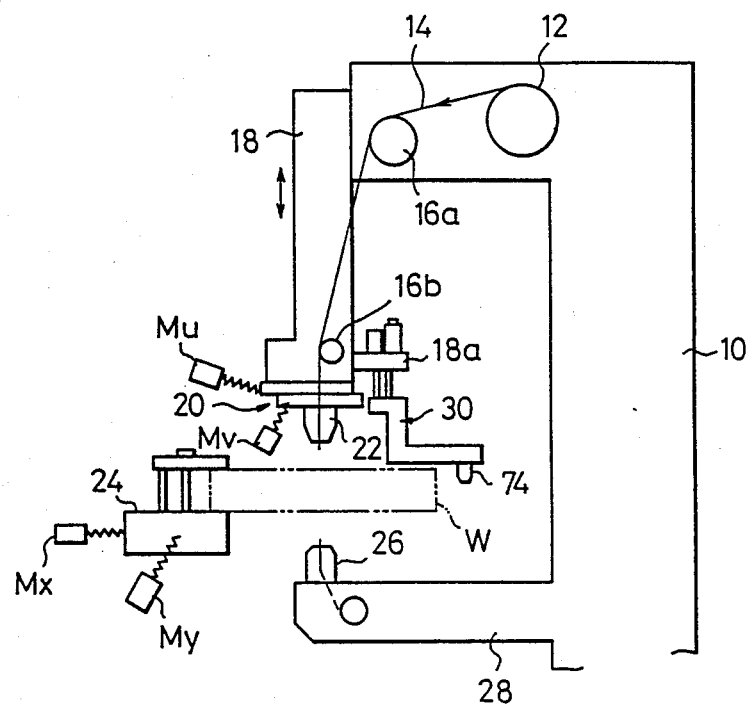
FIG. 1 is a diagrammatic view showing the constitution of a wire cut electric discharge machine, in a preferred embodiment according to the present invention.

Referring to FIG. 1, a wire cut electric discharge machine embodying the present invention has a motor-driven wire electrode feeding device 12 mounted on a machine frame 10. A wire electrode 14 fed by the wire electrode supplying device 12 is extended from a guide roller 16a via a guide roller 16b provided on a Z-axis column 18 to an upper head 22 having a built-in upper guide and attached to a taper-machining table assembly 20 joined to the lower end of the Z-axis column, then the wire electrode 14 is passed via an electric discharge machining region for a work W secured to a horizontally planar X-axis and Y-axis work table 24 through a lower head 26 having a built-in lower guide, and a guide roller 16c supported on an arm 28, and the wire electrode 14 is collected by a suitable wire electrode recovering device. The work W is moved laterally relative to the wire electrode 14 according to the controlled movement of the X- and Y-axes work table 24 so as to be exposed to the wire cut electric discharge machining action of the wire electrode 14 traveling along a desired locus in the electric discharge machining region. The wire cut electric discharge machine is provided with a repairing unit 30 for repairing the wire electrode 14 in case the wire electrode 14 is broken accidentally during the wire cut electric discharge machining operation due to inappropriate machining conditions or the like. The constitution and function of the repairing unit 30 will be described afterward.

Referring again to FIG. 1, the X- and Y-axes work table 24 is driven by an X-axis driving motor Mx and a Y-axis driving motor My for movement within a horizontal plane in the respective directions of an X-axis and a Y-axis. The operation of the X-axis driving motor Mx and the Y-axis driving motor My is controlled by a CNC unit illustrated in FIG. 4. Similarly, the taper-machining table assembly 20 is driven by a U-axis driving motor Mu and a V-axis driving motor Mv for movement within a horizontal plane. Thus, the wire electrode 14 passing the upper head 22 attached to the taper-machining table 20 is able to travel along an inclined path for the taper-machining of the work W in the electric discharge machining region. The U-axis driving motor Mu and the V-axis driving motor Mv are controlled also by the CNC unit illustrated in FIG. 4.

Figure 2:
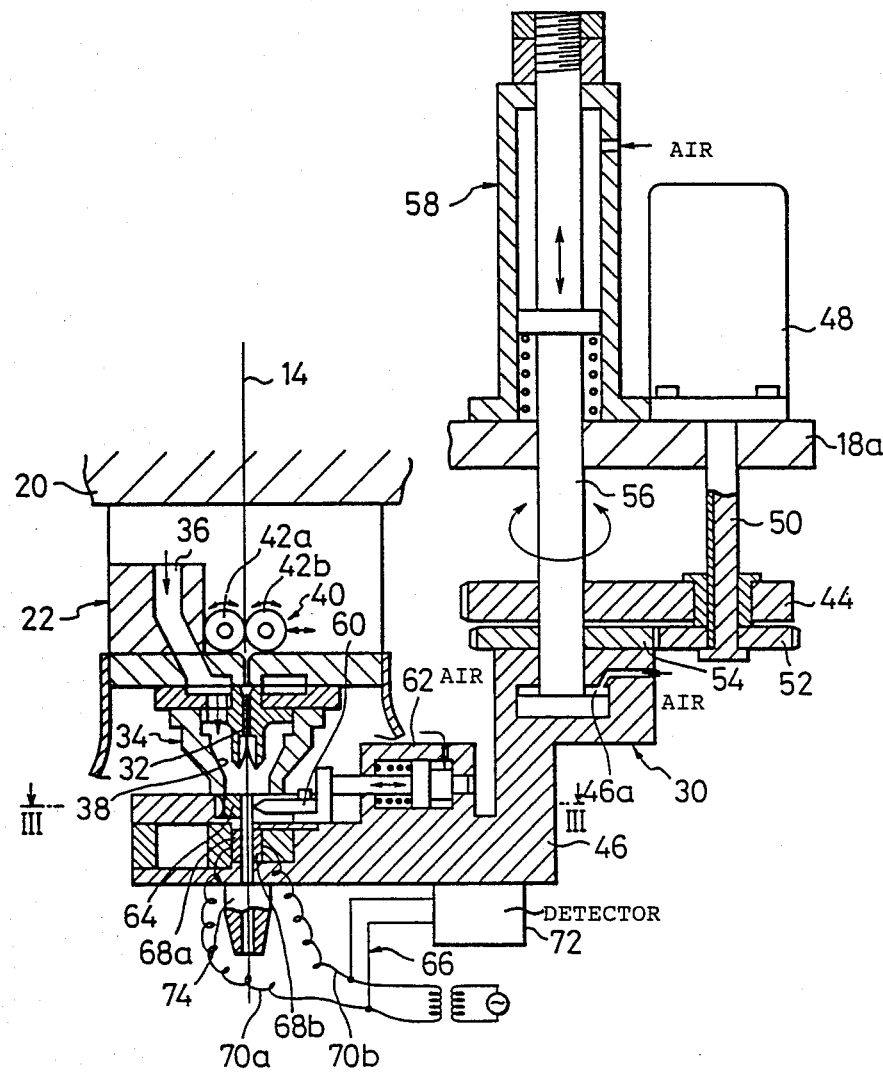
FIG. 2 is a sectional view showing an upper head and a wire electrode repairing unit of the wire cut electric discharge machine of FIG. 1.

Referring now to FIG. 2 showing the respective constructions of the upper head 22 and the repairing unit 30 in detail, the repairing unit 30, which in the normal state is reserved at a resting position shown in FIG. 1, has been turned to and positioned at a repairing position beneath the upper head 22. As shown in FIG. 2, the upper head 22 has an upper guide 32 through which the wire electrode 14 is passed, and an upper nozzle 34 surrounding the upper guide 32. A passage 38 for discharging a pressurized electric discharge machining liquid supplied through an inlet port 36 into the upper nozzle 34 is formed in the upper nozzle 34. The electric discharge machining liquid that flows along the passage 38 promotes the electric discharge machining action and removes waste chips during the ordinary wire cut electric discharge machining operation. The jet of the electric discharge machining liquid is used also for directing the wire electrode 14 from the upper head 22 to a lower head 26 (FIG. 1) and for extending the wire electrode 14 between the upper head 22 and the lower head 26, which will be described afterward. The electric discharge machining liquid is supplied from an external supply source into the inlet port 36 by a known means, and hence the description of the manner of supplying the electric discharge machining liquid into the inlet port 36 will be omitted. The upper head 22 includes a wire electrode feeding mechanism 40, such as a wire feeding mechanism 9 disclosed, for example, in the aforesaid Japanese Unexamined Patent Publication No. 56-3146. When the wire electrode 14 is broken, the wire electrode feeding mechanism 40 draws back the broken end of the wire electrode 14 from the electric discharge machining region for the work W (FIG. 1), grips the broken end of the wire electrode at a holding position, and feeds the broken end of the wire electrode 14 from the holding position to a wire cutter, which will be described later, to allow the wire cutter to cut and remove the broken end. During the normal wire cut electric discharge machining operation, the roller 42b of the wire electrode feeding mechanism 40 is separated laterally from the roller 42a of same to allow the free travel of the wire electrode 14 under a fixed tension from the upper head 22 toward the lower head 26 (FIG. 1) for electric discharge machining of the work W in the electric discharge machining region. Although not shown in FIGS. 1 and 2, a power supply element for supplying power for electric discharge machining to the wire electrode 14, and a wire breakage detecting mechanism which detects the breakage of the wire electrode are provided in the neighborhood of the upper head 22. The power supply element and the wire breakage detecting mechanism may be of a known constitution, and hence the description thereof will be omitted.

The repairing unit 30 has an upper bracket 44 and a lower swivel bracket 46. The upper bracket 44 is movable only vertically relative to an arm 18a laterally extending from the Z-axis column 18 (FIG. 1), while the swivel bracket 46 is driven by a rotary piston pneumatic motor 48 through the output shaft 50 of the rotary piston pneumatic motor 48, a pinion 52 and a driven gear 54 for swiveling motion on a rotary shaft 56 relative to the upper bracket 44 between a position directly below the upper head 22 and the resting position as illustrated in FIG. 1. The rotary shaft 56 serves as the piston rod of a straight type pneumatic motor 58. The upper bracket 44, the lower swivel bracket 46 and the rotary shaft 56 are capable of being moved together in vertical directions.

At a lower position, the swiveling motion of the lower swivel bracket 46 is carried out. After being swiveled to the resting position, the lower swivel bracket 46 is raised to an upper position to avoid the repairing unit 30 interfering with the upper head 22 during the normal electric discharge machining.

On the other hand, when the repairing unit 30 is located directly below the upper head 22, compressed air is supplied into an air chamber 46a formed in the lower swivel bracket 46 to hold the repairing unit 30 in close contact with the upper nozzle 34 of the upper head 22 to prevent the electric discharge machining liquid from being dispersed toward the external environment of the upper head 22.

The lower swivel bracket 46 is provided with a cutter 60 and a pneumatic actuator 62 for actuating the cutter 60. The cutting edge of the cutter 60 is located opposite to the running path of the wire electrode 14 when the repairing unit 30 is located directly below the upper head 22. The cutter 60 is actuated for cutting action in cooperation with a cutting block 64 by the pneumatic actuator 62.

A wire end detecting unit 66 for detecting the broken end of the wire electrode 14 is mounted on the lower swivel bracket 46. The wire end detecting unit 66 consists, for example, of an electric contact detection system. The wire end detecting unit 66 detects the broken end of the conductive wire electrode 14. The wire end detecting unit 66 comprises a pair of opposite conductive detecting plates 68a and 68b which are located opposite to a return path when the broken end of the wire electrode 14 is drawn back under the upper head 22 along the return path by the wire electrode feeding mechanism 40, detection voltage applying lines 70a and 70b connecting an AC power source to the detecting plates 68a and 68b to apply an AC voltage to the detecting plates 68a and 68b, respectively, and a detector 72 which detects a voltage drop across the detection voltage applying lines 70a and 70b due to the contact of the detecting plates 68a and 68b with the broken end of the wire electrode 14. The detecting plates 68a and 68b are electrically insulated with insulating plates from the outside thereof.

The lower swivel bracket 46 is further provided with a jet nozzle 74. The jet nozzle 74 spouts a jet of the machining liquid after the broken end of the wire electrode 14 has been cut off to introduce the wire electrode 14 into the lower head 26 in extending the wire electrode again between the upper head 22 and the lower head 26 (FIG. 1).

Figure 3:
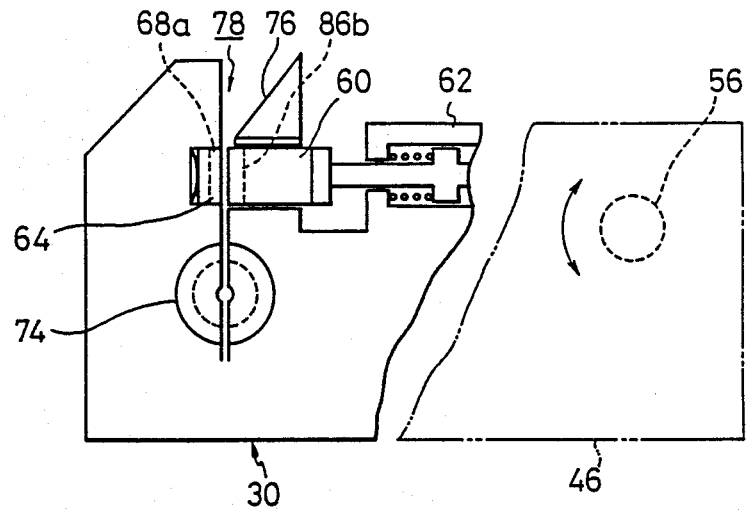
FIG. 3 is a horizontal sectional view taken along the line III—III in FIG. 2.

In FIG. 3 showing the lower swivel bracket 46 in a horizontal section, there are shown the disposition of the cutter 60, the conductive detecting plates 68a and 68b of the wire end detecting unit 66 and the jet nozzle 74, and a wire electrode inlet port 78 having an inclined wall 76 formed in the lower swivel bracket 46. When the lower swivel bracket 46 is turned on the rotary shaft 56 to a position directly blow the upper head 22, the wire electrode 14 extending from the upper head 22 toward the lower head 26 (FIG. 1) is guided by the inclined wall 76 into the wide open wire electrode inlet port 78. The cutter 60 and the cutting block 64 are placed directly above the conductive detecting plates 68a and 68b, while the jet nozzle 74 is set aside relative to the cutter 60. Accordingly, after the broken end of the wire electrode 14 has been repaired by the wire end detecting unit 66 and the cutter 60, the lower swivel bracket 46 is turned further by the rotary piston pneumatic motor 48 (FIG. 2) so as to position the jet nozzle 74 directly below and in alignment with the repaired free end of the wire electrode 14 gripped by the wire electrode feeding mechanism 40 (FIG. 2).

Figure 4:
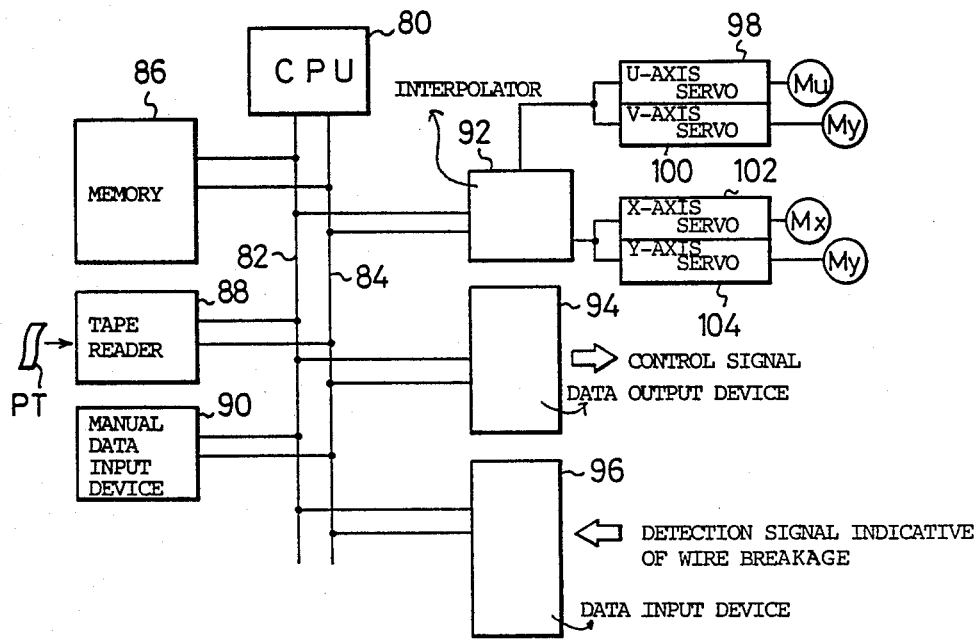
FIG. 4 is a block diagram of a CNC unit employed for controlling the operation of the wire cut electric discharge machine of FIG. 1.

FIG. 4 is a block diagram showing the constitution of the CNC unit. Basically, the constitution of the CNC unit is identical with that of a CNC unit employed in the conventional wire cut electric discharge machine. That is, the CNC unit comprises a central processing unit (abbreviated to "CPU" hereinafter) 80, a memory 86, a tape reader 88, a manual data input device 90, an interpolator 92, a data output device 94, and a data input device 96, which are interconnected by an address bus 82 and a data bus 84. A U-axis servo circuit 98 and a V-axis servo circuit 100 for controlling the U-axis driving motor Mu and the V-axis driving motor Mv of the taper-machining table, respectively, and an X-axis servo circuit 102 and a Y-axis servo circuit 104 for controlling the X-axis driving motor Mx and the Y-axis driving motor My of the work table 24, respectively, are connected to the interpolator 92.

The tape reader 88 reads control data for controlling the wire cut electric discharge machining operation recorded on a recording medium, for example, a tape PT. The CPU 80 controls the driving motors Mu, Mv, Mx, and My through the interpolator 92 and the servo circuits 98, 100, 102, and 104 on the basis of a control program stored beforehand in the memory 86 to carry out a desired wire cut electric discharge machining operation by controlling the movement of the work table 24 mounted with the work and the taper-machining table 20 relative to the wire electrode 14 running at a fixed speed. Detection signals including a wire breakage detection signal are transmitted through the data input device 96 to the CPU 80, and then control signals commanding actions to be taken in response to the detection signals, for example, stop and restart of the wire electrode supplying device 12, shift of the repairing unit 30 to the operating position and to the resting position, are provided from the data output device 94. In the present invention, the manual data input device 90 is used, for example, for manually giving a repetition signal commanding repetitive actuation of the cutter 60 by the pneumatic actuator 62 to remove the broken end of the wire electrode 14 by an optional length in removing the broken end of the wire electrode 14.

The operation of the wire cut electric discharge machine of the present invention thus constituted for repairing a broken end of the wire electrode 14 to prepare for restarting the wire cut electric discharge machining will be described hereinafter.

Upon the detection of a breakage of the wire electrode 14 during the wire cut electric discharge machining operation, the CNC unit receives a detection signal through the data input device 96. Then, the CPU 80 provides control signals through the data output device 94 to stop the wire electrode supplying operation of the wire supplying device 12 and to interrupt the wire cut electric discharge machining operation. Then, the broken end of the wire electrode extending from the work W to the lower head 26 is recovered and the upper head 22 is raised a predetermined distance by the Z-axis column 18. Upon the detection of the rise of the upper head 22 by the predetermined distance by a suitable means, the repairing unit 30 is turned by the rotary piston pneumatic motor 48 and is positioned at a position directly below the upper head 22, namely, a first position where the detecting plates 68a and 68b of the wire end detecting device 66 and the cutter 60 are located directly below the upper head 22. The angular amount of swivel motion of the repairing unit 30 is dependent on the angular amount of rotation of the rotary piston of the rotary piston pneumatic motor 48. The pair of rollers 42a and 42b of the wire electrode feeding mechanism 40 are brought into engagement to draw back the broken wire electrode 14. Upon the detection of the broken end of the wire electrode 14 by the wire end detecting device 66, the operation for drawing back the wire electrode 14 is stopped. In a state where the wire electrode 14 is thus gripped by the wire feeding mechanism 40 and the operation of the wire feeding mechanism 40 is interrupted, the broken end of the wire electrode 14 is drawn outside the electric discharge machining region for the work W. Then, in response to a wire end detection signal, the CPU 80 actuates the X-axis servo circuit 102 and the Y-axis servo circuit 104 through the interpolator 92 to shift the work table 24 relative to the upper head 22 and the repairing unit 30 so that the broken end of the wire electrode 14 is located outside the electric discharge machining region. Then, the pneumatic actuator 62 is actuated to cut off the faulty portion, namely, bent and/or roughened portion, of the broken end of the wire electrode 14 by the cooperative operation of the cutter 60 and the cutting block 64. When needed, the wire feeding mechanism 40 feeds the wire electrode 14 toward the wire end detecting device 66 to cut the free end of the wire electrode 14 several times so that the faulty portion of the wire electrode 14 is completely removed.

Upon the reception of a signal indicating the completion of a predetermined number of cutting cycles for removing the faulty portion of the wire electrode 14, the CPU 80 executes a control operation to position the upper head 22 at a predetermined electric discharge machining operation restarting position by shifting the work table 24 relative to the upper head 22. Then, the lower swivel bracket 46 is turned further and is positioned at a second position where the center hole of the jet nozzle 74 is aligned with the lower end of the wire electrode 14. In this state, the repairing unit 30 is in close contact with the upper nozzle 34 of the upper head 22. Then, the pair of rollers 42a and 42b of the wire electrode feeding mechanism 40 are disengaged from each other and the operation of the wire electrode supplying device 12 is restarted. At the same time, supply of the electric discharge machining liquid to the upper head 22, which has been interrupted simultaneously with the interruption of the electric discharge machining operation, is restarted. The wire electrode 14 is inserted in the lower head 26 by the agency of a jet of the electric discharge machining liquid spouting from the jet nozzle 74 and thereby the wire electrode 14 is extended between the upper head 22 and the lower head 26. In thus extending the wire electrode 14 between the upper head 22 and the lower head 26, the wire electrode 14 is extended through a machining restarting hole formed beforehand in the work W, when the electric discharge machining operation restarting position is in the work W, or the wire electrode 14 is extended directly from the upper head 22 to the lower head 26, when the electric discharge machining restarting position is outside the side wall of the work W.

After the wire electrode 14 has been thus extended between the upper head 22 and the lower head 26, the repairing unit 30 is turned by the rotary piston pneumatic motor 48 from the position directly below the upper head 22 to the resting position. Then, the Z-axis column 18 is lowered to locate the upper head 22 again at the electric discharge machining position. Then, if a machining path has been formed in the work W through the previous electric discharge machining, the machining program for controlling the movement of the work table 24 in the respective directions of the X-axis and the Y-axis is restarted to move the work W relative to the wire electrode 14 so that the wire electrode 14 is moved along the machining path to the position where the breakage of the wire electrode 14 occurred. After the wire electrode 14 has been thus returned to the position where the breakage of the wire electrode 14 occurred without performing electric discharging, the wire cut electric discharge machining operation is restarted.

Although the present invention has been described with reference to a preferred embodiment thereof, naturally, various modifications thereof are possible without departing from the scope of technical idea of the present invention. For example, the repairing unit employed in the foregoing embodiment, formed in a swiveling structure which is turned by a rotary piston pneumatic motor may be formed in a straight type structure which is moved vertically or laterally by a motor. Naturally, the wire end detecting device is not limited to a detecting device of the electric contact detection system.

According to the present invention, when the wire electrode is broken during the wire cut electric discharge machining operation, the wire electrode is extended again between the upper head and the lower head after perfectly removing the faulty portion of the broken end of the wire electrode. Accordingly, the wire electrode can be surely extended between the upper and lower heads to make preparations for restarting the wire cut electric discharge machining operation without fail. Furthermore, since the faulty portion of the broken end of the wire electrode is removed and thrown away at a position outside the electric discharge machining region, the possibility of reoccurrence of the breakage of the wire electrode owing to the removed piece of the wire electrode remaining on the work is eliminated. Thus, the present invention enables the smooth control of the wire cut electric discharge machining operation by the CNC unit.

We claim:

1. A wire cut electric discharge machine comprising:
   a work table for holding a work, capable of being automatically moved in a plane defined by an X-axis and a Y-axis;
   a wire electrode supplying device for supplying a wire electrode through an electric discharge machining region of a work held on the work table;
   an upper head and a lower head having built-in wire guides, respectively, and disposed above and below the work table, respectively;
   an automatic wire electrode setting mechanism which automatically passes the wire electrode supplied by the wire electrode supplying device through the work and extends the wire electrode automatically between the upper and lower heads by the agency of a jet of an electric discharge machining liquid for automatic preparation for restarting the electric discharge machining operation;
   a wire breakage detecting mechanism for detecting the breakage of the wire electrode; and
   a repairing unit for repairing a broken wire electrode, capable of engaging and disengaging from the upper head;
   wherein said machine further comprises a wire electrode feeding mechanism provided on said upper head for drawing out a broken end of the wire electrode broken in the electric discharge machining region during an electric discharge machining operation, from the electric discharge machining region and holding the broken end of the wire electrode so as to be able to be drawn out;

a broken end detecting means for detecting the broken end of said wire electrode outside said electric discharge machining region;

a shifting means for shifting the work table relatively from said electric discharge machining region to a predetermined wire repairing position upon detection of said broken end of said wire electrode by said broken end detecting means, including an XY driving mechanism for moving said work table in a plane defined by an X-axis and a Y-axis relative to said upper head, and returning the work table from said wire electrode repairing position to said electric discharge machining region; and a cutter means for cutting said broken end of the wire electrode to repair said broken end of the wire electrode while said work table is at said wire electrode repairing position.

2. A wire cut electric discharge machine according to claim 1, further comprising a jet nozzle for spouting a jet of said electric discharge machining liquid to guide and convey the wire electrode from said upper head to said lower head.

3. A wire cut electric discharge machine according to claim 1, wherein said repairing unit comprises said broken end detecting means and said cutter means, and said repairing unit is a movable unit capable of being moved to and moved away from said electric discharge machining region.

4. A wire cut electric discharge machine according to claim 1, wherein said broken end detecting means comprises a pair of broken end detecting plates which provide an electric signal indicating that the pair of broken end detecting plates are in electrical contact with the conductive wire electrode or an electric signal that the pair of broken end detecting plates are not in contact with the conductive wire electrode.

5. A wire cut electric discharge machine according to claim 1, wherein said cutter means comprises a cutter which is actuated by a pneumatic actuator, and a cutting block with which the cutting edge of the cutter is brought into engagement for cutting action.

* * * * *